July 14, 1931.  J. H. DORAN  1,814,833
SHAFT BEARING
Filed June 20, 1929
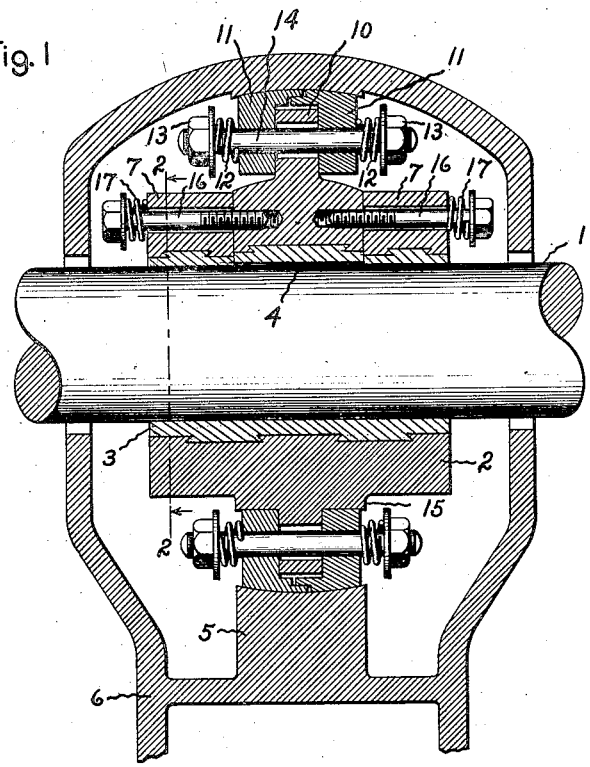
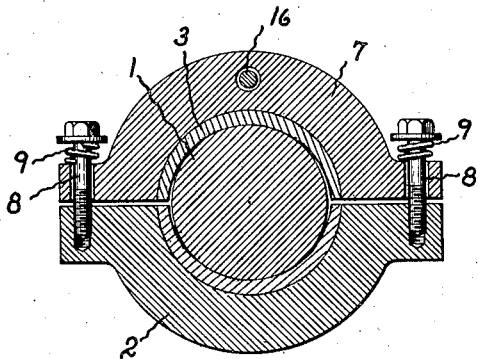
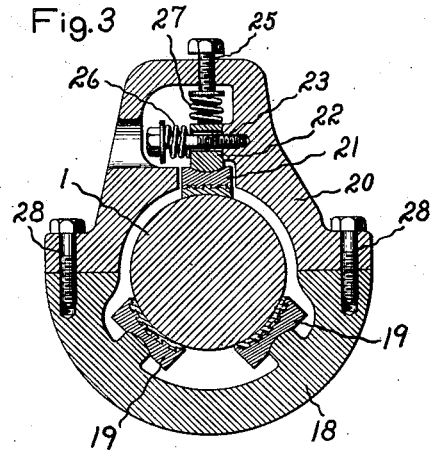
Inventor
John H. Doran
by Charles E. Tulla
His Attorney Patented July 14, 1931

1,814,833

UNITED STATES PATENT OFFICE

JOHN H. DORAN, OF SCHENECTADY, NEW YORK, ASSIGNOR TO GENERAL ELECTRIC COMPANY, A CORPORATION OF NEW YORK

SHAFT BEARING

Application filed June 20, 1929. Serial No. 372,287.

This application is a continuation in part of my application Serial No. 220,782, filed Sept. 20, 1927, for shaft bearings and assigned to the same assignee as the present application.

The invention relates to shaft bearings and especially to shaft bearings for relatively large, high-speed machinery such as elastic fluid turbines, centrifugal compressors and the like.

When high-speed machines operate in the vicinity of or above their critical speeds, there is a tendency for the phenomena known as shaft whipping to occur, the phenomena being manifested in a whirling motion of the rotor. Shaft whipping is most pronounced at the critical speeds.

The object of my invention is to provide an improved bearing construction which will prevent or at least greatly minimize the occurrence of shaft whipping, and for a consideration of what I believe to be novel and my invention, attention is directed to the accompanying description and the claims appended thereto.

In the drawings, Fig. 1 is a longitudinal sectional view of a bearing embodying my invention; Fig. 2 is a detail sectional view taken on line 2—2 of Fig. 1; and Fig. 3 is a detail sectional view similar to Fig. 2 of another embodiment of my invention.

According to my invention I provide yielding means for clamping the shaft down on its bearing, such means being located preferably at the two ends of the bearing, although it may be located otherwise, for example, at the center of the bearing. This serves to hold the shaft tightly in its bearing and to prevent it from rolling around inside the bearing. At the same time, however, it is capable of yielding when the force exceeds a predetermined high value. In connection with this yielding clamping means I may provide a friction means which also resists displacement of the shaft, and I may further provide a friction means for the bearing as a whole, which friction means serve to absorb vibration energy.

Referring to the drawings, 1 indicates a shaft and 2 indicates a bearing for the shaft, the bearing lining being indicated at 3. A horizontal shaft is illustrated. The shaft rests on the bearing lining at its lower side, there being a slight clearance on the top of the shaft as is indicated at 4 for the circulation of lubricant. The bearing is supported on a spherical seat 5 which forms a part of the bearing casing and pedestal 6.

The bearing construction so far described is a known one and is to be taken as typical of any suitable bearing design.

According to the embodiment of my invention illustrated in Figs. 1 and 2, I clamp the shaft down in the bearing by means of two semi-circular clamping members 7 located at opposite ends of the bearing and held yieldingly in position by studs 8 beneath the heads of which are springs 9. The studs are turned down to put springs 9 under the desired amount of compression and when thus adjusted it will be seen that shaft 1 can move in its bearing only by overcoming the force of springs 9. The springs thus serve to hold the shaft down yieldingly in its bearing and to prevent occurrence of the phenomena above referred to. Studs 8 extend through oversize openings in members 7 to permit a slight relative movement of members 2 and 7.

I may provide in addition to the yielding means above a friction means for resisting displacement of the shaft by retaining the two clamping members 7 in rubbing contact with the upper part of bearing 2 by means of bolts 16 adjustably threaded into the bearing 2 with springs 17 on said bolts 16 employed to effect the desired frictional resistance between the clamping members 7 and the bearing 2. Bolts 16 extend through oversize openings in members 7. Springs 9 are made of sufficient strength to restore members 7 to their normal positions as shown in Fig. 2 against the frictional resistance effected by the action of springs 17.

In connection with the yielding holding means or the yielding and friction holding means for the shaft as just described, I may provide also a friction holding means for the bearing 2 and to this end I may employ an arrangement such as that disclosed in the patent to Clough, No. 1,019,424, patented March 5, 1912, wherein the bearing 2 is provided with a flange 10 located between two rings 11, the peripheral surfaces of the rings being spherical for engagement with the spherical seat 5. Rings 11 are held in frictional engagement with flange 10 by means of springs 12 located between the rings and nuts 13 on the ends of studs 14, the studs extending through oversized openings in flange 10. By adjusting nuts 13, the desired frictional engagement between ring 11 and flange 10 can be obtained. The bearing 2 is supported in its normal central position by projections 15 which engage rings 11.

Fig. 3 discloses another embodiment of my invention in which 1 indicates a shaft and 19 and 21 indicate bearing elements for the shaft. Bearing elements 19 are mounted in a lower bearing cap 18 and element 21 in an upper cap member 20. The cap members 18 and 20 are clamped together by suitable studs 28. The bearing element 21 is yieldingly held against the shaft by springs 27 and a block 22. One or more studs 23 each having a spring 26, hold the block 22 in frictional engagement with a suitable surface on the cap 20. The studs extend through oversize openings in block 22 and thread into the cap 20. Studs 25 threaded through the top of cap 20 afford means for adjusting the tension of springs 27 which are of sufficient strength to overcome the frictional resistance of block 22 on cap 20 caused by the action of springs 26. Fig. 3 shows but one stud 23 and 25 each provided with a spring 26 or 27 but it is to be understood that block 22 extends to full length of the bearing element 21 and that a number of studs 23 and 25 may be used each being provided with its spring as shown. In this embodiment the whipping action of shaft 1 is opposed by the action of springs 27 and the frictional resistance of block 22 rubbing on cap 20. This bearing may be employed in conjunction with one or more bearings of ordinary type in which case it serves to hold the shaft down in said bearings. If found desirable, a stop may be provided for bearing element 21 on block 22 to limit the amount the shaft can deflect.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a shaft and a bearing for the shaft, there being a clearance between the shaft and the top wall of the bearing, of yielding means for holding the shaft down in its bearing, and friction means associated with the shaft and bearing for opposing vibration of said shaft relative to the bearing.

2. The combination with a shaft and a bearing for the shaft, there being a clearance between the shaft and the top wall of the bearing, of a curved member, yielding means for holding the curved member in engagement with the shaft whereby the shaft is held in engagement with its bearing, and friction means associated with the shaft and bearing for opposing vibration of said shaft relative to the bearing.

3. The combination with a shaft, a bearing for the shaft, there being a clearance between the shaft and the top wall of the bearing, and a mounting means for the bearing, of a curved member yielding means for holding the curved member in engagement with the shaft whereby the shaft is held down in its bearing, friction means associated with the shaft and bearing for opposing vibration of the shaft relative to the bearing, and friction means associated with the bearing and mounting means for opposing vibration of the bearing relative to the mounting.

4. In a shaft bearing construction, the combination of means providing a spherical seat, a bearing having a lining, a shaft which rests on said lining, there being a clearance between the shaft and the top wall of the bearing, friction means through the intermediary of which said bearing is supported on said spherical seat, yielding means for clamping the shaft down in its bearing, and friction means associated with the shaft and bearing for opposing vibration of the shaft relative to the bearing.

5. The combination with a shaft and a bearing for the shaft, there being a clearance between the shaft and the top wall of the bearing, of yielding means disposed at opposite ends of the bearing and engaging the shaft for holding the same down in its bearing.

6. The combination with a shaft and a bearing for the shaft, of a curved member located at each end of the bearing, and yielding means for holding the curved members in engagement with the shaft whereby the shaft is held in engagement with its bearing.

7. The combination with a shaft and a bearing for the shaft, there being a clearance between the shaft and the top wall of the bearing, of yielding means engaging the shaft on opposite ends of the bearing for holding the shaft down in its bearing, and friction means associated with the shaft and bearing for holding the bearing from vibration.

8. In a shaft bearing construction, the combination of means providing a spherical seat, a bearing having a lining, friction means through the intermediary of which said bearing is supported on said spherical seat, and yielding means engaging the shaft on opposite ends of the bearing for clamping the shaft down in its bearing.

9. The combination with a shaft and a bearing for the shaft, there being a clearance between the shaft and the top wall of the bearing, of means providing a radially extending flat surface on the bearing, a member which engages directly the shaft to hold the shaft down in its bearing, said member having a flat surface which engages the first named flat surface, and yielding means which holds said flat surfaces in engagement with each other.

10. The combination with a shaft and a bearing for the shaft, there being a clearance between the shaft and the top wall of the bearing, of means providing radially extending flat surfaces on opposite sides of the bearing, members which engage directly the shaft to hold it down in its bearing, said members having flat surfaces which engage the first named flat surfaces, and yielding means which holds said flat surfaces in engagement.

In witness whereof, I have hereunto set my hand this 18th day of June, 1929.

JOHN H. DORAN.